UNITED STATES PATENT OFFICE.

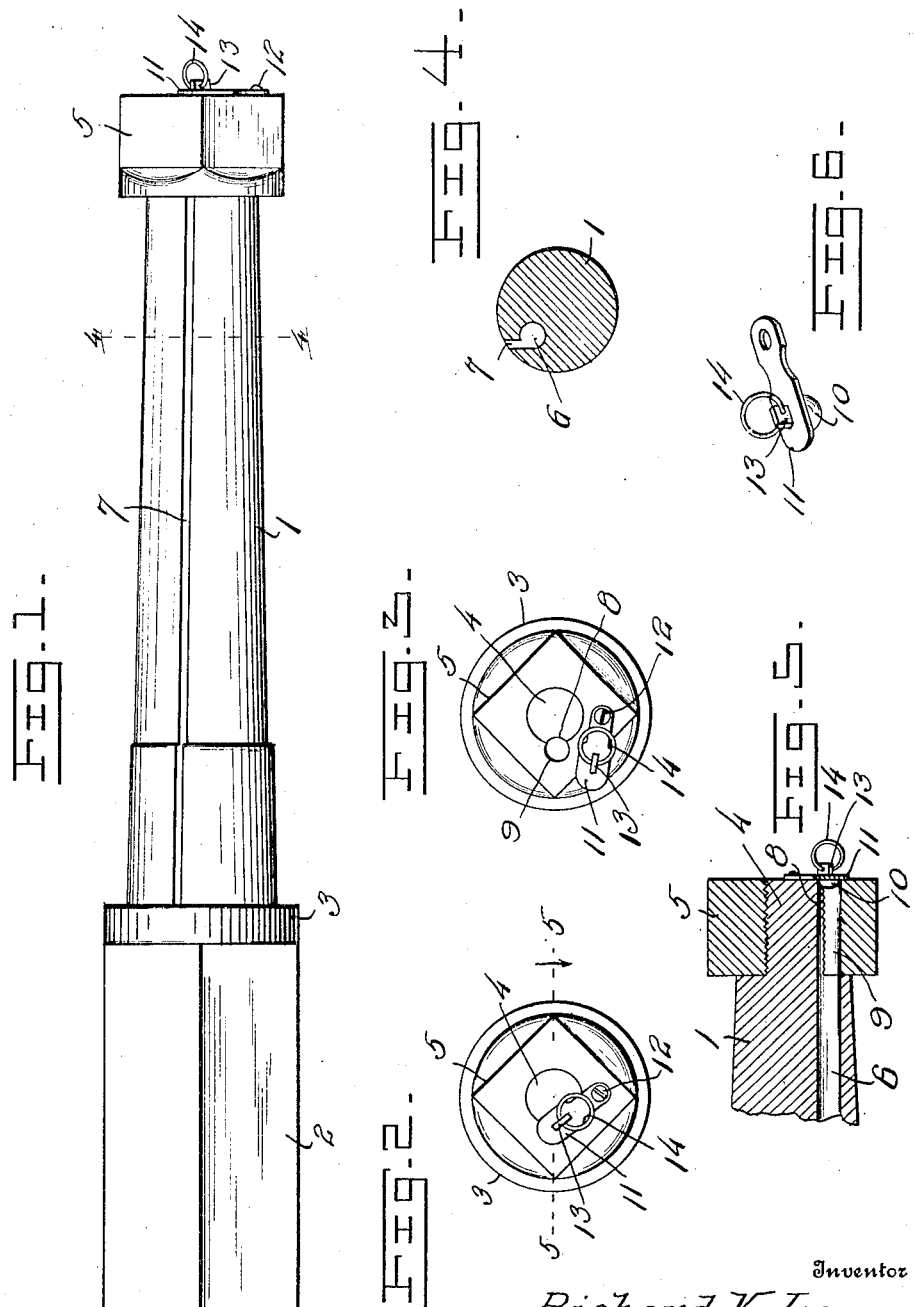

RICHARD VALENTINE LEE, OF CALISTOGA, CALIFORNIA.

AXLE.

No. 892,436.     Specification of Letters Patent.     Patented July 7, 1908.

Application filed February 11, 1908. Serial No. 415,394.

*To all whom it may concern:*

Be it known that I, RICHARD V. LEE, a citizen of the United States, residing at Calistoga, in the county of Napa and State of California, have invented certain new and useful Improvements in Axles, of which the following is a specification, reference being had to the accompanying drawings.

My invention relates to improvements in axles for the wheels of wagons and other vehicles and more particularly to means for lubricating the axles and locking their wheel retaining nuts.

The object of the invention is to provide an improved construction by means of which the axle may be quickly and easily lubricated without removing the nut or the wheel from it and which will effectively lock the nut so that it cannot possibly work loose and off of the axle.

With the above and other objects in view, the invention consists of the novel features of construction and the combination and arrangement of parts hereinafter fully described and claimed, and illustrated in the accompanying drawings, in which Figure 1 is a perspective view of my improved vehicle axle; Figs. 2 and 3 are end views of the same; Fig. 4 is a detail cross section taken on the plane indicated by the line 4—4 in Fig. 1; Fig. 5 is a detail longitudinal section taken on the plane indicated by the line 5—5 in Fig. 2; and Fig. 6 is a perspective view of the pivoted locking member.

In the drawings 1 denotes a tapered spindle formed upon an axle 2 of a vehicle or the like and having at its inner end an annular stop flange or shoulder 3 and at its outer end a reduced screw threaded stem 4 for the reception of a nut 5 which retains the wheel upon the spindle. In the latter is formed a longitudinally extending bore or chamber 6 and a longitudinally extending slit 7, which latter communicates with the bore 6 and opens upon the exterior of the spindle as clearly shown in Figs. 1 and 4. The bore or chamber 6 is preferably arranged to one side of the vertical center of the axle spindle and the slit 7 is arranged as seen in Fig. 4. Said bore 6 is also so disposed and of such size that a portion of it extends into or forms a longitudinal groove 8 in the threaded stem 4 as will be noted upon reference to Figs. 3 and 5. The nut 5 is formed with a longitudinal opening 9 which is so located that when the nut is screwed up upon the stem and against the shoulder at the end of the spindle, formed by reducing it to provide the stem, said opening 9 will register with and form a continuation of the bore 6 and the groove 8. By constructing the spindle and nut in this manner it will be seen that grease or other lubricant may be readily forced into the bore 6 by inserting the mouth piece or tube of a suitable injecting device in the opening 9 in the nut and then operating such device. When this is done, the grease will be forced through the slit 7 so as to lubricate the axle and the wheel thereon. For the purpose of closing the outer end of the lubricating bore or chamber to prevent the entrance of dust and dirt and for the further purpose of locking the nut against rotation upon the axle, I provide a pin or plug 10 which is adapted to snugly fit the opening 9 in the nut and the groove or notch 8 in the stem 4, as will be seen upon reference to Fig. 5. This plug may be retained in its operative position in any suitable manner but I preferably mount it upon a spring member 11 in the form of a flat resilient plate which is pivoted by a screw or the like 12 upon the outer face of the nut. The plug 10 is attached to the free end of the spring plate 11, preferably, by forming it with a reduced shank 13 which is inserted in an opening formed in said spring plate and which is apertured to receive a ring 14, the latter serving both to retain the shank in the aperture and as a finger piece by means of which the closure and locking member may be operated. The resiliency of the plate 11 serves to hold the plug 10 in the opening 9 to close the latter and the bore 6 and to also lock the nut against rotation upon the stem 4, owing to the engagement of said plug with the groove 8; and the resiliency of said plate 11 also permits of the ready removal of the plug from the opening 9 when it is desired to unlock the nut and to lubricate the axle. It will be seen that by grasping the finger piece or ring 14 and pulling outwardly upon the same the plug 10 may be disengaged from the nut and by then swinging the plate to one side, as shown in Fig. 3, the opening 9 in the nut will be exposed to permit of the insertion of the grease injecting device.

Having thus described my invention what I claim is:

1. An axle having a spindle provided with an externally screw threaded stem and a longitudinally extending, eccentrically disposed bore or chamber for a lubricant, said bore or chamber having a portion extending through the threaded end of the spindle, a nut having a screw threaded bore to engage the threaded end of the spindle, said bore of the nut being formed with a longitudinal groove to aline with the bore or chamber in the spindle and a removable plug to project partly into the groove in the bore of the nut and partly into the bore or chamber in the end of the spindle to simultaneously lock the nut against rotation upon the spindle and to prevent the escape of the lubricant.

2. An axle having a spindle provided with an externally screw threaded stem and a longitudinally extending, eccentrically disposed bore or chamber for a lubricant, said bore or chamber having a portion extending through the threaded end of the spindle, a nut having a screw threaded bore to engage the threaded end of the spindle, said bore of the nut being formed with a longitudinal groove to aline with the bore or chamber in the spindle, a removable plug to project partly into the groove in the bore of the nut and partly into the bore or chamber in the end of the spindle to simultaneously lock the nut against rotation upon the spindle and to prevent the escape of the lubricant, and means for attaching said plug to the nut.

3. An axle having a spindle provided with an externally screw threaded stem and a longitudinally extending, eccentrically disposed bore or chamber for a lubricant, said bore or chamber having a portion extending through the threaded end of the spindle, a nut having a screw threaded bore to engage the threaded end of the spindle, said bore of the nut being formed with a longitudinal groove to aline with the bore or chamber in the spindle, a removable plug to project partly into the groove in the bore of the nut and partly into the bore or chamber in the end of the spindle to simultaneously lock the nut against rotation upon the spindle and to prevent the escape of the lubricant, and a resilient member for supporting said plug.

4. An axle having a spindle provided with a reduced stem and a longitudinally extending bore or chamber for a lubricant, a portion of said bore extending through the stem, a nut upon the stem having an opening to register with said bore in the spindle, a pivoted spring upon the nut and a plug carried by said spring and adapted to enter the opening in the nut to close said opening and lock the nut against rotation.

5. An axle having a spindle formed with a reduced screw threaded stem and with a longitudinally extending bore and a longitudinally extending slit in communication with the bore and opening upon the exterior of the spindle, said stem being formed with a longitudinal groove to form a continuation of a portion of the bore in the spindle, a nut upon said stem formed with a longitudinal opening to register with the bore in the spindle, a spring pivoted upon the nut and a plug carried by the spring and adapted to enter the opening in the nut and the groove in said stem, for the purpose set forth.

6. An axle having a spindle provided with an externally screw threaded stem and a longitudinally extending, eccentrically disposed bore or chamber for a lubricant, said bore or chamber having a portion extending through the threaded end of the spindle, a nut having a screw threaded bore to engage the threaded end of the spindle, said bore of the nut being formed with a longitudinal groove to aline with the bore or chamber in the spindle, a removable plug to project partly into the groove in the bore of the nut and partly into the bore or chamber in the end of the spindle to simultaneously lock the nut against rotation upon the spindle and to prevent the escape of the lubricant, and a pivoted member for supporting said plug.

7. An axle having a spindle provided with an externally screw threaded stem and a longitudinally extending, eccentrically disposed bore or chamber for a lubricant, said bore or chamber having a portion extending through the threaded end of the spindle, a nut having a screw threaded bore to engage the threaded end of the spindle, said bore of the nut being formed with a longitudinal groove to aline with the bore or chamber in the spindle, a removable plug to project partly into the groove in the bore of the nut and partly into the bore or chamber in the end of the spindle to simultaneously lock the nut against rotation upon the spindle and to prevent the escape of the lubricant, and a pivotally mounted resilient supporting member having the plug attached to its free end.

In testimony whereof I hereunto affix my signature in the presence of two witnesses.

RICHARD VALENTINE LEE.

Witnesses:
FRANK S. CROUCH,
G. S. CRUSON.